US009458364B2

(12) United States Patent
Inao et al.

(10) Patent No.: US 9,458,364 B2
(45) Date of Patent: Oct. 4, 2016

(54) ADHESIVE SHEET

(75) Inventors: Youichi Inao, Tokyo (JP); Mikihiro Kashio, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 166 days.

(21) Appl. No.: 13/638,282

(22) PCT Filed: Feb. 23, 2011

(86) PCT No.: PCT/JP2011/053931
§ 371 (c)(1),
(2), (4) Date: Sep. 28, 2012

(87) PCT Pub. No.: WO2011/122178
PCT Pub. Date: Oct. 6, 2011

(65) Prior Publication Data
US 2013/0017392 A1    Jan. 17, 2013

(30) Foreign Application Priority Data
Mar. 31, 2010   (JP) ................................ 2010-081415

(51) Int. Cl.
G11B 5/64      (2006.01)
B32B 7/02      (2006.01)
B32B 27/32     (2006.01)
C08G 18/08     (2006.01)
C08K 5/06      (2006.01)
C08L 93/00     (2006.01)
C09J 175/04    (2006.01)
C08G 18/10     (2006.01)
C08G 18/48     (2006.01)
C08L 33/14     (2006.01)
C09J 133/14    (2006.01)
C09J 7/02      (2006.01)
C08F 220/18    (2006.01)

(52) U.S. Cl.
CPC ............. *C09J 175/04* (2013.01); *C08G 18/10* (2013.01); *C08G 18/4825* (2013.01); *C08L 33/14* (2013.01); *C09J 7/0207* (2013.01); *C09J 133/14* (2013.01); *C08F 2220/1808* (2013.01); *C09J 2433/00* (2013.01); *C09J 2475/00* (2013.01); *Y10T 428/265* (2015.01); *Y10T 428/2878* (2015.01); *Y10T 428/2887* (2015.01)

(58) Field of Classification Search
CPC .. C09J 7/0246; C09J 2433/00; C09J 7/0217; C09J 2475/00; C09J 133/04; C09J 133/14; C09J 133/10; C09J 175/04; C08F 2220/1808; Y10T 428/265; Y10T 428/2878; Y10T 428/2887
USPC ................... 428/212–220, 343, 355; 528/78; 524/761–762, 764
See application file for complete search history.

(56) References Cited

U.S. PATENT DOCUMENTS

| 3,718,712 | A | * | 2/1973 | Tushaus | 525/458 |
| 4,543,405 | A | * | 9/1985 | Ambrose et al. | 528/78 |
| 2008/0262613 | A1 | * | 10/2008 | Gogolewski | 623/11.11 |
| 2009/0012258 | A1 | | 1/2009 | Shimoma et al. | |
| 2009/0042004 | A1 | | 2/2009 | Yano et al. | |

FOREIGN PATENT DOCUMENTS

| CN | 101052663 A | 10/2007 | |
| JP | 62 295982 | 12/1987 | |
| JP | 62 297373 | 12/1987 | |
| JP | 2003306653 A * | 10/2003 | C09J 7/02 |
| JP | 2004 2827 | 1/2004 | |
| JP | 2005 7618 | 1/2005 | |
| JP | 2005 194366 | 7/2005 | |
| JP | 2005 325250 | 11/2005 | |
| JP | 2006 281488 | 10/2006 | |
| JP | 2007 277510 | 10/2007 | |
| JP | 2008 102271 | 5/2008 | |
| JP | 2008 133435 | 6/2008 | |
| JP | 2008 255038 | 10/2008 | |
| JP | 2009 35692 | 2/2009 | |
| JP | 2009 155532 | 7/2009 | |
| JP | 2009 158503 | 7/2009 | |
| JP | 2009155532 A * | 7/2009 | |
| WO | 2007 046365 | 4/2007 | |

OTHER PUBLICATIONS

JP 2003306653 A Machine Translation.*
JP 2009155532 A Machine Translation.*
Definition of alkanolamine.*
Combined Chinese Office Action and Search Report issued May 21, 2013, in Chinese Patent Application No. 201180017193.6 with English translation.
International Search Report Issued in PCT/JP11/53931 Filed Feb. 23, 2011.

* cited by examiner

Primary Examiner — Prashant J Khatri
Assistant Examiner — Travis Figg
(74) Attorney, Agent, or Firm — Oblon, McClelland, Maier & Neustadt, L.L.P.

(57) ABSTRACT

According to the present invention, there can be obtained a pressure sensitive adhesive sheet having an adhesive layer which even when the thickness is reduced to 5 μm or less, exhibits a desired adhesive strength. The pressure sensitive adhesive sheet includes a base material having an adhesive layer provided on at least one surface thereof, wherein a pressure sensitive adhesive constituting the adhesive layer contains (A) an acrylic copolymer having a crosslinkable functional group and (B) a urethane resin, the urethane resin is a product obtained by allowing an isocyanate-terminated urethane prepolymer obtained by a reaction between [b1] a diol and [b2] a polyvalent isocyanate compound to react with [b3] a chain extender, and the chain extender is composed of [b4] a compound having two hydroxyl groups and/or amino groups and [b5] a compound having three or more hydroxyl groups and/or amino groups, in a proportion of [b4] to [b5] of from 7/3 to 10/0 in terms of a mass ratio.

14 Claims, No Drawings

ADHESIVE SHEET

CROSS REFERENCE TO RELATED APPLICATION

This application is a 371 of PCT/JP2011/053931, filed on Feb. 23, 2011, and claims priority to Japanese Patent Application 2010-081415, filed on Mar. 31, 2010.

TECHNICAL FIELD

The present invention relates to a pressure sensitive adhesive sheet, in particular, a pressure sensitive adhesive sheet which exhibits a desired adhesive strength even when an adhesive layer thereof is formed as a thinner layer.

BACKGROUND ART

The adhesive strength of an adhesive has dependency upon an applying amount, namely, a thickness of an adhesive layer to be formed, and in pressure sensitive adhesive sheets which are used for labels, tapes, and the like, the thickness of the adhesive layer is set up in conformity with a variety of purposes. However, there are not many examples of making the thickness thinner than 10 μm for the purpose of producing stable adhesive strength.

In recent years, in electronic appliances, optical appliances, and the like, reduction of thickness in products is desired, and pressure sensitive adhesive sheets which are used for joining or temporary bonding at the time of processing or the like of members constituting an electronic appliance or an optical appliance are also similarly desired to be thinned.

As for reduction of thickness in the adhesive layer in a pressure sensitive adhesive sheet which is used for joining or temporary bonding at the time of processing of members of an electronic appliance or an optical appliance, there have been made a variety of proposals. Though there may be the case where reduction of thickness is conducted as a measure for lowering the adhesive strength, there may also be the case where even when the adhesive layer is reduced in thickness, a lowering of the adhesive strength is not occasionally desirable.

For example, in Patent Document 1, removable properties of a protective film for a liquid crystal screen or the like are enhanced by controlling the thickness of an adhesive layer composed of a two-pack crosslinking type acrylic pressure sensitive adhesive to from 2 to 10 μm (from 2.5 to 3 μm in the Examples), namely, the adhesive strength is lowered by means of reduction of thickness.

In Patent Document 2, peeling-off from a laminated circuit board is made easy by controlling the thickness of an adhesive layer composed of a silicone based pressure sensitive adhesive from 0.5 to 20 μm (1.0 μm in Examples), namely, the adhesive strength is lowered by means of reduction in thickness.

In Patent Document 3, an object thereof resides in the matter that even when the thickness of an adhesive layer is reduced to a level of from 2 to 10 μm (3 μm in Examples), the bonding reliance on a liquid crystal display or the like is not lowered by using a rubber-based pressure sensitive adhesive, namely, even when the adhesive layer is reduced in thickness, the adhesive strength is not lowered.

In Patent Document 4, an object thereof resides in the matter that even when the thickness of an adhesive layer is reduced to a degree of from 2 to 10 μm (from 2 to 7 μm in the working examples), the bonding reliance on an optical member is not lowered by using a rubber-based pressure sensitive adhesive, namely, even when the adhesive layer is reduced in thickness, the adhesive strength is not lowered.

In Patent Document 5, removable properties in a wafer processing step are enhanced by controlling a total thickness of two adhesive layers composed of a crosslinking type acrylic pressure sensitive adhesive or the like to less than 10 μm (from 3 to 7 μm per one layer in Examples), namely, the adhesive strength is lowered by means of reduction in thickness.

Furthermore, in Patent Document 6, a pressure sensitive adhesive type optical film using a pressure sensitive adhesive containing a (meth) acrylic polymer having a large weight average molecular weight and composed of a heterocyclic ring-containing acrylic monomer and (meth) acrylic acid, a hydroxyalkyl (meth)acrylate, and an alkyl (meth)acrylate, and a crosslinking agent, and the like, are disclosed; it is described that the thickness of an adhesive layer is from 1 to 15 μm; and an object thereof resides in the matter that even when the adhesive layer is reduced in thickness, the adhesive strength is not lowered. However, in Examples of Patent Document 6, though it is described that the adhesive strength of the adhesive layer in a thickness of 5 μm is about 6N/25 mm, the adhesive strength in the case that the adhesive layer is more reduced in thickness is not described.

On the other hand, also in general-purpose acrylic pressure sensitive adhesives such as those for skin-sticking use, label use, etc., and the like, when reduction in thickness is conducted, a lowering of the adhesive strength is remarkably observed, too especially in a region of less than 5 μm.

In consequence, in general-purpose pressure sensitive adhesive sheets, any improvement for aiming to especially make the adhesive layer thin to a degree useful for the foregoing electronic appliances and the like has not been proposed yet.

For example, in Patent Document 7, the thickness of an adhesive layer formed of an acrylic pressure sensitive adhesive or a rubber based pressure sensitive adhesive in a transdermal preparation sheet is controlled to from 10 to 80 μm; however, it is not aimed that even when the adhesive layer is reduced in thickness, the adhesive strength is not lowered.

In addition, in Patent Document 8, there is proposed an easily applicable pressure sensitive adhesive sheet which is suitable as a large-sized pressure sensitive adhesive sheet for decoration, such as those for a signboard, a wall, a vehicle, etc. However, the thickness of an adhesive layer is from 7 to 100 μm, and it is not aimed that even when the adhesive layer is reduced in thickness, the adhesive strength is not lowered (estimated about 30 μm in the Examples).

Furthermore, Patent Document 9 discloses a pressure sensitive adhesive composition for general-purpose pressure sensitive adhesive sheet containing a urethane resin prepared by using two kinds of chain extenders having three or more functional groups and an acrylic polymer. However, in the Examples, an initial adhesive strength and removable properties are merely measured in a thickness of the adhesive layer of 25 μm, and it is not aimed that even when the adhesive layer is reduced in thickness, the adhesive strength is not lowered.

PRIOR ART DOCUMENTS

Patent Documents

Patent Document 1: JP-A-2005-007618
Patent Document 2: JP-A-2006-281488

Patent Document 3: JP-A-2008-133435
Patent Document 4: JP-A-2008-102271
Patent Document 5: JP-A-2009-158503
Patent Document 6: JP-A-2007-277510
Patent Document 7: JP-A-2008-255038
Patent Document 8: JP-A-2009-035692
Patent Document 9: JP-A-2009-155532

SUMMARY OF THE INVENTION

Problems to be Solved by the Invention

In view of such circumstances, the present invention has been made, and an object thereof is to provide a pressure sensitive adhesive sheet in which even when an adhesive layer thereof is reduced in thickness to, for example, 5 μm or less, a high adhesive strength is exhibited, namely the adhesive strength is not lowered by reduction in thickness.

Means for Solving the Problems

In order to achieve the foregoing object, the present inventors made extensive and intensive investigations. As a result, it has been found that even when the thickness of an adhesive layer is reduced to 5 μm or less, a high adhesive strength is exhibited by mixing a urethane resin synthesized using a chain extender having a specified functional group and an acrylic polymer having a crosslinkable functional group in a specified ratio, leading to accomplishment of the present invention.

That is, the present invention provides the following:
(1) An pressure sensitive adhesive sheet comprising a base material having an adhesive layer provided on at least one surface thereof, wherein a pressure sensitive adhesive constituting the adhesive layer contains (A) an acrylic copolymer having a crosslinkable functional group and (B) a urethane resin, the urethane resin is a product obtained by allowing an isocyanate-terminated urethane prepolymer obtained by a reaction between [b1] a diol and [b2] a polyvalent isocyanate compound to react with [b3] a chain extender, and the chain extender is composed of [b4] a compound having two hydroxyl groups and/or amino groups and [b5] a compound having three or more hydroxyl groups and/or amino groups, in a proportion of [b4]/[b5] of from 7/3 to 10/0 in terms of a mass ratio;
(2) The pressure sensitive adhesive sheet as set forth above in (1), wherein the diol [b1] is a glycol having a molecular weight of from 1,000 to 3,000;
(3) The pressure sensitive adhesive sheet as set forth above in (1) or (2), wherein the [b4] is a compound having a hydroxyl group and an amino group;
(4) The pressure sensitive adhesive sheet as set forth above in any one of (1) to (3), wherein the crosslinkable functional group is one derived from an ethylenically unsaturated carboxylic acid or a hydroxyalkyl(meth)acrylate;
(5) The pressure sensitive adhesive sheet as set forth above in any one of (1) to (4), wherein a monomer constituting the (A) further contains a nitrogen-containing ethylenically unsaturated monomer as a constituent component;
(6) The pressure sensitive adhesive sheet as set forth above in any one of (1) to (5), further containing (C) a crosslinking agent;
(7) The pressure sensitive adhesive sheet as set forth above in any one of (1) to (6), wherein the acrylic copolymer (A) and the urethane resin (B) are contained in a proportion of (A)/(B) of from 40/60 to 1/99 in terms of a mass ratio;
(8) The pressure sensitive adhesive sheet as set forth above in any one of (1) to (7), wherein a weight average molecular weight (Mw) of the acrylic copolymer is from 300,000 to 1,500,000; and
(9) The pressure sensitive adhesive sheet as set forth above in any one of (1) to (8), wherein a thickness of the adhesive layer is from 0.1 to 5 μm.

Effects by the Invention

According to the present invention, there can be obtained a pressure sensitive adhesive sheet which even when an adhesive layer thereof is reduced in thickness, is able to produce high adhesive strength. By reduction of thickness in the adhesive layer, it is possible to contrive to reduce an applying amount of a pressure sensitive adhesive and to reduce the costs and decrease of a total thickness at the time of forming a multilayered structure, and hence, the present invention is useful in a variety of fields.

BEST MODES FOR CARRYING OUT THE INVENTION

The pressure sensitive adhesive sheet of the present invention is a pressure sensitive adhesive sheet comprising a base material having an adhesive layer provided on at least one surface thereof, wherein the adhesive layer is made of a pressure sensitive adhesive containing (A) an acrylic polymer having a crosslinkable functional group and (B) a urethane resin and containing, as components of the urethane resin, a compound having two hydroxyl groups and/or amino groups and a compound having three or more hydroxyl groups and/or amino groups in a specified ratio.

First of all, there is described the acrylic copolymer having a crosslinkable functional group that is the component (A), which is used for the adhesive layer in the present invention.

The acrylic copolymer having a crosslinkable functional group that is the component (A) is an acrylic copolymer obtained by polymerizing a monomer mixture composed mainly of a (meth)acrylate ester. This monomer mixture is composed mainly of a (meth) acrylate ester and contains a monomer having a crosslinkable functional group which is reactive with a crosslinking agent as described later.

Incidentally, the (meth)acrylate as referred to in the present specification means both of acrylate and methacrylate. The same is also applicable to other analogous terminologies.

The crosslinkable functional group as referred to herein is specifically a carboxyl group, a hydroxyl group, an amino group, or the like. Of these, a carboxyl group and a hydroxyl group are preferable, and from the viewpoint of obtaining a higher adhesive strength by a reaction with an isocyanate based crosslinking agent that is a preferred crosslinking agent as described later, a carboxyl group is especially preferable.

Specific examples of the (meth) acrylate which is used as the main component include methyl (meth) acrylate, ethyl (meth)acrylate, propyl (meth)acrylate, butyl (meth)acrylate, pentyl (meth)acrylate, hexyl(meth)acrylate, cyclohexyl (meth)acrylate, 2-ethylhexyl(meth)acrylate, isooctyl(meth) acrylate, decyl(meth)acrylate, dodecyl(meth)acrylate, myristyl(meth)acrylate, palmityl(meth)acrylate, stearyl(meth) acrylate, and so on. These may be used solely or may be used in combination of two or more kinds thereof.

Above all, butyl(meth)acrylate, in particular n-butylacrylate is preferable. From the viewpoint that even when the adhesive layer is reduced in thickness, the adhesive strength is not lowered, it is preferable that the (meth)acrylate contains 50% by mass or more a butylacrylate unit, and it is more preferable that the (meth)acrylate contains 70% by mass or more of a butyl acrylate unit.

In addition, as specific examples of the monomer having a crosslinkable functionalgroup, there can be exemplified ethylenically unsaturated carboxylic acids such as (meth) acrylic acid, itaconic acid, crotonic acid, maleic acid, fumaric acid, etc.; hydroxyalkyl(meth)acrylate such as 2-hydroxyethyl(meth)acrylate, 4-hydroxybutyl(meth)acrylate, 2-hydroxypropyl(meth)acrylate, 3-hydroxypropyl (meth) acrylate, 2-hydroxybutyl(meth)acrylate, and 3-hydroxybutyl (meth)acrylate; monoalkylaminoalkyl (meth)acrylates such as monomethylaminoethyl(meth)acrylate, monoethylaminoethyl(meth)acrylate, monomethylaminopropyl (meth)acrylate, and monoethylaminopropyl(meth)acrylate, and so on. These can be used solely or in combination of two or more kinds thereof.

Among the foregoing monomers having a crosslinkable functional group, from the viewpoint of reactivity with an isocyanate based crosslinking agent that is a preferred crosslinking agent, as described later, and from the viewpoint that even when the adhesive layer is reduced in thickness, a high adhesive strength is produced, ethylenically unsaturated carboxylic acids and hydroxyalkyl(meth) acrylates are preferable.

In addition, in view of the fact that a favorable adhesive strength can be imparted, it is preferable that the monomer having a crosslinkable functional group further contains a nitrogen-containing ethylenically unsaturated monomer as a constituent component.

As examples of the nitrogen-containing ethylenically unsaturated monomer, there can be exemplified (meth) acrylamide, N-methylol(meth)acrylamide, N-methyl (meth) acrylamide, methoxyethyl(meth)acrylamide, N-vinylpyrrolidone, N,N-dimethyl(meth)acrylamide, N,N-diethyl (meth)acrylamide, N,N-diisopropyl (meth) acrylamide, N-vinylcaprolactam, N-(meth)acryloylmorpholine, and so on. Of these, N-(meth)acryloylmorpholine is preferable because a favorable adhesive strength can be imparted. These can be used solely or in combination of two or more kinds thereof.

Incidentally, the nitrogen-containing ethylenically unsaturated monomer may be selected among the foregoing monomers having a crosslinkable functional group.

As the case may be, the component (A) may contain other monomer as a constituent component. As other monomer, there can be exemplified vinyl esters such as vinylacetate, vinylpropionate, etc.; olefins such as ethylene, propylene, isobutylene, etc.; halogenated olefins such as vinyl chloride, vinylidene chloride, etc.; aromatic vinyl monomers such as styrene, methylstyrene, vinyltoluene, etc.; diene based monomers such as butadiene, isoprene, chloroprene, etc.; nitrile based monomers such as (meth)acrylonitrile, etc.; and so on. These can be used solely or in combination of two or more kinds thereof.

A use amount of the monomer having a crosslinkable functional group is from 0.1 to 25% by mass, preferably from 0.5 to 20% by mass, and more preferably from 3 to 15% by mass based on total weight of the monomer components constituting the component (A).

By forming a pressure sensitive adhesive composed of a composition obtained by preparing a copolymer while allowing the amount of the monomer having a crosslinkable functional group to fall within the foregoing range and then blending it with a urethane resin as described later, even when the adhesive layer is reduced in thickness, an adhesive strength can be produced.

In the case of containing a nitrogen-containing ethylenically unsaturated monomer, its content is preferably from 1 to 2% by mass based on total amount of the monomer components constituting the component (A). In that case, it should be construed that a monomer in which a nitrogen atom is contained in the monomer having a crosslinkable functional group is included in the nitrogen-containing ethylenically unsaturated monomer. By allowing the content thereof to fall within the foregoing range, polarity can be imparted to the acrylic copolymer, and a favorable adhesive strength can be imparted.

In the pressure sensitive adhesive sheet of the present invention, the acrylic copolymer having a crosslinkable functional group that is the component (A) is not particularly limited with respect to a copolymerization form thereof, and all of random, block and graft copolymers may be adopted. In addition, from the standpoints of an adhesive performance and the like, its molecular weight is in the range of preferably from 300,000 to 1,500,000, and more preferably from 400,000 to 1,000,000 in terms of a weight average molecular weight (Mw).

When the Mw is less than 300,000, there is a concern that a cohesive strength of the adhesive layer is lowered, and the adhesive strength is lowered. What the Mw exceeds 1,500,000 is not preferable because an elastic modulus of the adhesive layer becomes excessively high, and the adhesive strength is lowered.

Incidentally, the foregoing Mw is a value based on comparison with standard polystyrene, which is measured by means of gel permeation chromatography (GPC).

In the pressure sensitive adhesive sheet of the present invention, the acrylic copolymer that is this component (A) may be used solely or may be used in combination of two or more kinds thereof.

The preparation of the acrylic copolymer in the pressure sensitive adhesive sheet of the present invention can be conducted in the usual way in the presence or absence of a solvent. As the solvent, there can be exemplified ethyl acetate, toluene, and so on, and as a polymerization initiator, there can be exemplified azobisisobutyronitrile, benzoyl peroxide, and so on. Polymerization conditions are not particularly limited, and in general, the polymerization is conducted under conditions at from 50 to 90° C. for from 2 to 30 hours.

Hereinafter, there is described the urethane resin that is the component (B) in the pressure sensitive adhesive sheet of the present invention.

The urethane resin that is the component (B) is a product obtained by allowing an isocyanate-terminated urethane prepolymer obtained by a reaction between [b1] a diol and [b2] a polyvalent isocyanate compound to react with [b3] a chain extender. Furthermore, in the component (B), the chain extender is one composed of [b4] a compound having two hydroxyl groups and/or amino groups and [b5] a compound having three or more hydroxyl groups and/or amino groups.

Hereinafter, there are described specific examples of each of the foregoing components in the urethane resin that is the component (B).

First of all, the diol that is the [b1] component in the isocyanate-terminated urethane prepolymer before allowing it to react with the chain extender is described.

As the diol, there can be exemplified low molecular weight dials such as alkanediols, for example, 1,3-propanediol, 1,4-butanediol, 1,5-pentanediol, neopentyl glycol, 1,6-hexanediol, and 1,7-heptanediol; low molecular weight alkylene glycols such as ethylene glycol, propylene glycol, diethylene glycol, and dipropylene glycol; medium molecular weight glycols having a molecular weight of from several hundred to several thousand, such as polyalkylene glycols, for example, polyethylene glycol, polypropylene glycol, and polybutylene glycol, polyoxyalkylene glycols, for example, polytetramethylene glycol, etc.; and so on.

Above all, from the viewpoint that the obtained isocyanate-terminated urethane prepolymer is hardly gelled at the time of allowing it to react with a chain extender as described later, it is preferable to use a medium molecular weight glycol having a molecular weight of from about 1,000 to 3,000 as the diol that is the [b1] component.

The foregoing diol may be used solely or in combination of two or more kinds thereof.

Hereinafter, there is described the polyvalent isocyanate compound that is the component [b2] in the isocyanate-terminated urethane prepolymer.

As the polyvalent isocyanate compound, there can be used known aromatic polyisocyanates, aliphatic polyisocyanates and alicyclic polyisocyanates, and the like.

Examples of the aromatic polyisocyanate include 1,3-phenylene diisocyanate, 1,4-phenylene diisocyanate, 4,4'-diphenylmethane diisocyanate (MDI), 2,4-tolylene diisocyanate (2,4-TDI), 2,6-tolylene diisocyanate (2,6-TDI), 4,4'-toluidine diisocyanate, 2,4,6-triisocyanatotoluene, 1,3,5-triisocyanatobenzene, dianisidine diisocyanate, 4,4'-diphenylether diisocyanate, 4,4',4"-triphenylmethane triisocyanate, 1,4-tetramethylxylylene diisocyanate, 1,3-tetramethylxylylene diisocyanate, and so on.

Examples of the aliphatic polyisocyanate include trimethylene diisocyanate, tetramethylene diisocyanate, hexamethylene diisocyanate (HMDI), pentamethylene diisocyanate, 1,2-propylene diisocyanate, 2,3-butylene diisocyanate, 1,3-butylene diisocyanate, dodecamethylene diisocyanate, 2,4,4-trimethylhexamethylene diisocyanate, and so on.

Examples of the alicyclic polyisocyanate include 3-isocyanatomethyl-3,5,5-trimethylcyclohexyl isocyanate (IPDI), 1,3-cyclopentane diisocyanate, 1,3-cyclohexane diisocyanate, 1,4-cyclohexane diisocyanate, methyl-2,4-cyclohexane diisocyanate, methyl-2,6-cyclohexane diisocyanate, 4,4'-methylenebis(cyclohexyl isocyanate), 1,4-bis(isocyanatomethyl)cyclohexane, 1,4-bis(isocyanatomethyl)cyclohexane, and so on.

The polyvalent isocyanate compound may be a modified product of the foregoing polyisocyanate, for example, a trimethylolpropane adduct type modified product, a biuret type modified product obtained by a reaction with water, or an isocyanurate type modified product having an isocyanurate ring incorporated thereinto.

Among the foregoing polyvalent isocyanate compounds, one or more members selected from MDI, 2, 4-TDI, 2, 6-TDI, HMDI, IPDI, and modified products thereof are preferable because of excellent physical properties of the pressure sensitive adhesive. Furthermore, when weather resistance is regarded as important, one or more members selected from HMDI, IPDI, and modified products thereof are especially preferable.

A method for preparing the isocyanate-terminated urethane prepolymer is not particularly limited and, for example, there is exemplified a method in which [b1] and [b2] and optionally, a urethanization catalyst and a solvent are charged into a reactor and subjected to the preparation, and so on.

In order to allow the isocyanate group to remain in the end, it is preferable to conduct the reaction such that a blending ratio of [b1] and [b2] is from 1.1 to 3.0, and it is more preferable to conduct the reaction such that the subject blending ratio is from 1.3 to 2.5, in terms of a (molar number of NCO group)/(molar number of OH group) ratio. When it is less than 1.1, there is a tendency that gelation occurs to easily cause thickening, whereas when it exceeds 3.0, there is a tendency that a concentration of the unreacted polyvalent isocyanate compound in the isocyanate-terminated urethane prepolymer becomes too high, so that a chain extension reaction as described later is difficult.

In addition, though depending upon the reactivity of [b1] and [b2] to be used and the blending amount of the chain extender, the content of the isocyanate group (NCO %) in the isocyanate-terminated urethane prepolymer is preferably from 0.5 to 12% by mass, and more preferably from 1 to 4% by mass in terms of a value measured in conformity with JIS K1603. When the NCO % is less than 0.5% by mass, it may be impossible to allow a sufficient amount of the chain extender (as described later) to react, whereas when it exceeds 12% by mass, there is a tendency that it is difficult to control the chain extension reaction (as described later).

Examples of the catalyst used in the reaction for forming the isocyanate-terminated urethane prepolymer include known catalysts such as tertiary amine based compounds, organic metal based compounds, and so on.

Examples of the tertiary amine based compounds include triethylamine, triethylenediamine, N,N-dimethylbenzylamine, N-methylmorpholine, 1,8-diazabicyclo [5.4.0]undecane-7 (DBU), and so on.

Examples of the organic metal based compound include tin based compounds and non-tin based compounds. Examples of the tin based compound include dibutyltin dichloride, dibutyltin oxide, dibutyltin dibromide, dibutyltin dimaleate, dibutyltin dilaurate (DBTDL), dibutyltin diacetate, dibutyltin sulfide, tributyltin sulfide, tributyltin oxide, tributyltin acetate, triethyltinethoxide, tributyltin ethoxide, dioctyltin oxide, tributyltin chloride, tributyltin trichloroacetate, tin 2-ethylhexanoate, and so on. Examples of the non-tin based compound include titanium based compounds such as dibutyltitanium dichloride, tetrabutyl titanate, butoxytitanium trichloride, etc.; lead based compounds such as lead oleate, lead 2-ethylhexanoate, lead benzoate, lead naphthenate, etc.; iron based compounds such as iron 2-ethylhexanoate and iron acetyl acetonate, etc.; cobalt based compounds such as cobalt benzoate, cobalt 2-ethylhexanoate; zinc based compounds such as zinc naphthenate, zinc 2-ethylhexanoate, etc.; zirconium naphthenate; and so on.

Among the foregoing catalysts, DBTDL, tin 2-ethylhexanonate, tetrabutyl titanate, and the like are preferable. In addition, the foregoing catalysts may be used solely or in combination.

In addition, examples of the solvent include aromatic hydrocarbons such as toluene, xylene, etc., aliphatic hydrocarbons such as hexane, etc., esters such as ethyl acetate, butyl acetate, etc., ketones such as methyl ethyl ketone (MEK), etc., dimethylformamide, cyclohexanone, and so on. These may be used solely or in combination of two or more kinds thereof.

Reaction temperature in the reaction for forming the isocyanate-terminated urethane prepolymer is preferably 120° C. or less, and more preferably from 70 to 100° C. When the reaction temperature exceeds 120° C., not only the allophanate reaction proceeds so that it becomes difficult to synthesize the isocyanate-terminated urethane prepolymer having prescribed molecular weight and structure, but also it becomes difficult to control a reaction rate. When the reaction temperature is from 70 to 100° C., a reaction time is preferably from 2 to 20 hours.

Hereinafter, there is described the chain extender that is the component [b3] to be allowed to react with the isocyanate-terminated urethane prepolymer.

The chain extender [b3] in the present invention is composed of [b4] a compound having two hydroxyl groups and/or amino groups and [b5] a compound having three or more hydroxyl groups and/or amino groups, and the urethane resin that is the foregoing component (B) is obtained by allowing the chain extender [b3] to react with the foregoing isocyanate-terminated urethane prepolymer in a proportion (mass ratio) of [b4]/[b5] of from 7/3 to 10/0.

The component [b4] is described.

The component [b4] is a compound having two hydroxyl groups and/or amino groups.

Examples of the component [b4] include aliphatic diols, aliphatic diamines, alkanolamines, bisphenols, aromatic diamines, phenolamines, and so on. In the chain extender [b3], in view of the fact that a lowering of the adhesive strength can be more prevented from occurring, there are preferred at least one compounds selected from the group consisting of aliphatic diols, aliphatic diamines, alkanolamines, aromatic diamines, and bisphenols.

Examples of the aliphatic diol include low molecular weight alkanediols and low molecular weight alkylene glycols in the diols enumerated as the foregoing component [b1].

Examples of the aliphatic diamine include ethylenediamine, 1,3-propanediamine, 1,4-butanediamine, 1,5-pentanediamine, 1,6-hexanediamine, and so on.

Examples of the alkanolamine include monoethanolamine, monopropanolamine, isopropanolamine, and so on.

Examples of the bisphenols include bisphenol A and so on.

Examples of the aromatic diamines include diphenylmethanediamine, tolylenediamine, xylylenediamine, and so on.

Examples of the phenolamine include aminophenol and so on.

Hereinafter, the component [b5] is described.

The component [b5] is a compound having three or more hydroxyl groups and/or amino groups.

Examples of the component [b5] include polyols such as trimethylolpropane, ditrimethylolpropane, pentaerythritol, and dipentaerythritol; amino alcohols such as 1-amino-2,3-propanediol, 1-methylamino-2,3-propanediol, and N-(2-hydroxypropyl)ethanolamine); an ethylene oxide or propylene oxide adduct of tetramethylxylylenediamine; and so on.

From the viewpoint of reactivity with the isocyanate group, the amino group and/or the hydroxyl group in the foregoing component [b4] and component [b5] is preferably a primary amino group, a secondary amino group, or a primary hydroxyl group.

Hereinafter, the chain extension reaction is described.

In the chain extension reaction, the urethane resin that is the component (B) is obtained by allowing the isocyanate-terminated urethane polymer to react with the components [b4] and [b5] in a proportion (mass ratio) of [b4]/[b5] of from 7/3 to 10/0. The foregoing proportion is preferably from 8/2 to 9/1.

In the case where the [b4]/[b5] ratio is less than 7/3, when the adhesive layer is reduced in thickness, the adhesive strength is lowered, or gelation occurs at the time of the chain extension reaction for preparing a urethane resin, so that a desired pressure sensitive adhesive is not obtainable.

Examples of the chain extension reaction include (1) a method in which a solution of the isocyanate-terminated urethane prepolymer is charged into a reactor, the chain extender is dropped in the reactor, and the contents are allowed to react with each other; (2) a method in which the chain extender is charged into a reactor, a solution of the isocyanate-terminated urethane prepolymer is dropped, and the contents are allowed to react with each other; and (3) a method in which a solution of the isocyanate-terminated urethane prepolymer is diluted with a solvent, a prescribed amount of the chain extender is then added collectively in a reactor, and the contents are allowed to react with each other. In view of the fact that a uniform resin is easily obtainable because the isocyanate group is gradually decreased, the method (1) or (3) is preferable.

As the solvent, there can be used the same solvent to be used in the reaction for forming the isocyanate-terminated urethane prepolymer.

Though an addition amount of the chain extenders [b4] and [b5] varies depending upon the content of an NCO group of the isocyanate-terminated urethane prepolymer, it is an amount such that the content of the NCO group of the urethane resin after the chain extension is preferably from 0.01 to 1.0% by mass, and more preferably from 0.05 to 0.2% by mass. When the addition amount of the chain extender is an amount at which the content of the NCO group in the isocyanate-terminated urethane prepolymer is less than 0.01% by mass, thickening abruptly occurs at the time of the chain extension reaction, thereby easily causing gelation. When the addition amount of the chain extender is an amount at which the amount of the NCO group in the isocyanate-terminated urethane prepolymer exceeds 1.0% by mass, the chain extension reaction becomes insufficient, so that the urethane resin (B) having a desired molecular weight is not obtainable.

A reaction temperature in the chain extension reaction is preferably 80° C. or less. When the reaction temperature exceeds 80° C., the reaction rate is too fast so that it becomes difficult to control the reaction. Thus, there is a tendency that it is difficult to obtain the urethane resin (B) having desired molecular weight and structure. In the case of conducting the chain extension reaction in the presence of a solvent, the reaction temperature is preferably not higher than a boiling point of the solvent, and in particular, the reaction temperature is preferably from 40 to 60° C. in the presence of MEK or ethyl acetate.

An terminating agent may be used, too for the purpose of terminating the chain extension reaction. Examples of the terminating agent include a compound having only one active hydrogen capable of reacting with the isocyanate group and a compound having only one amino group.

Examples of the compound having only one active hydrogen capable of reacting with the isocyanate group include monool compounds such as methanol, ethanol, etc.

As the compound having only one amino group, there can be used a compound having a primary amino group or a secondary amino group, and examples thereof include diethylamine, morpholine, and so on.

The compound having one primary amino group has two active hydrogens, however, after one of the active hydrogens has reacted, the remaining active hydrogen has low reactivity, and hence, the compound becomes substantially equivalent to a monofunctional compound.

An addition amount of the terminating agent is preferably an amount at which a proportion of the terminating agent is 1 mole or more and 2 moles or less per mole of the terminal isocyanate group remaining after the chain extension reaction. When the addition amount of the terminating agent is less than 1 mole, the isocyanate group retains after the terminating reaction, so that the obtained urethane resin becomes instable. On the other hand, when the addition amount of the terminating agent exceeds 2 moles, there is a tendency that a low molecular weight urethane resin increases.

A weight average molecular weight of the urethane resin (B) is preferably 10,000 or more, this molecular weight based on comparison with standard polystyrene by means of GPC. When the weight average weight of the urethane resin is less than 10,000, there is a tendency that an adhesive characteristic, in particular, a holding power is lowered. In addition, the weight average molecular weight of the urethane resin (B) is preferably 300,000 or less. When the weight average molecular weight exceeds 300,000, there is a possibility of gelation. The weight average molecular weight of the urethane resin (B) is more preferably from 50,000 to 200,000.

In the present invention, it is preferable that the pressure sensitive adhesive composed of the foregoing acrylic polymer (A) and urethane resin (B) contains (A) and (B) in a proportion of (A)/(B) of from 40/60 to 1/99 in terms of a mass ratio. The proportion of (A)/(B) is more preferably from 30/70 to 10/90.

What both the case where the proportion of (A)/(B) exceeds 40/60 and the case where the proportion of (A)/(B) is less than 1/99 are not preferable because when the adhesive layer is reduced in thickness, the adhesive strength becomes low.

Hereinafter, there is described the crosslinking agent (C) which is optionally used together with the foregoing acrylic polymer (A) and urethane resin (B) in the pressure sensitive adhesive sheet of the present invention.

As the crosslinking agent (C), there can be exemplified isocyanate based crosslinking agents, epoxy based crosslinking agents, aziridine based crosslinking agents, metal chelate based crosslinking agents, amine based crosslinking agents, amino resin based crosslinking agents, and so on.

Above all, in particular, from the viewpoint that even when the adhesive layer is reduced in thickness, a high adhesive strength can be obtained, isocyanate based crosslinking agents are preferable. These crosslinking agents may be used solely or in combination of two or more kinds of the same type.

As specific examples of the isocyanate based crosslinking agent, there can be exemplified the same materials as those in the polyvalent isocyanate based compound that is the foregoing component [b2].

As specific examples of the epoxy based crosslinking agent, there is no particular limitation so far as it has two or more epoxy groups or glycidyl groups in a molecule thereof. However, the use of a polyfunctional epoxy compound having two or more epoxy groups in a molecule thereof is preferable.

As the polyfunctional epoxy compound, for example, there can be used a diglycidyl ether of bisphenol A and an oligomer thereof, a diglycidyl ether of hydrogenated bisphenol A and an oligomer thereof, diglycidyl orthophthalate, diglycidyl isophthalate, diglycidyl terephthalate, glycidyl p-oxybenzoate, diglycidyl tetrahydrophthalate, diglycidyl hexahydrophthalate, diglycidyl succinate, diglycidyl adipate, diglycidyl sebacate, ethylene glycol diglycidyl ether, propylene glycol diglycidyl ether, 1,4-butanediol diglycidyl ether, 1,6-hexanediol diglycidyl ether, a polyalkylene glycol diglycidyl ether, triglycidyl trimellitate, triglycidyl isocyanurate, 1,4-diglycidyloxybenzene, diglycidylpropyleneurea, glycerol triglycidyl ether, trimethylolpropane di-or triglycidyl ether, pentaerythritol di-or triglycidyl ether, a triglycidyl ether of a glycerol alkylene oxide adduct, a diglycidylamine such as diglycidylaniline, and so on.

Though the aziridine based crosslinking agent is not particularly limited, specific examples thereof include 1,1'-(methylene-di-p-phenylene)bis-3,3-aziridinylurea, 1,1'-(hexamethylene)bis-3,3-aziridinylurea, 2,4,6-triaziridinyl-1,3,5-triazine, trimethylolpropane-tris-(2-aziridinylpropionate), and so on. These are used solely or in combination of two or more kinds thereof.

Examples of a commercially available product as the aziridine based crosslinking agent include BXX5134 (aziridine based curing agent, prepared by Toyo Ink Co., Ltd.) and so on.

Examples of the metal chelate based crosslinking agent include, for example, compounds in which acetylacetone, ethyl acetoacetate, or the like coordinates on a polyvalent metal such as aluminum, iron, copper, zinc, tin, titanium, nickel, antimony, magnesium, vanadium, chromium, zirconium, etc. and so on. Specific examples of the metal chelate based crosslinking agent include NACEM ALUMINUM, prepared by Nihon Kagaku Sangyo Co., Ltd., in which acetylacetone coordinates on aluminum; and so on.

Examples of the amine based crosslinking agent include polyamines such as aliphatic polyamines (for example, triethylenetetramine, tetraethylenepentamine, ethylenediamine, N,N-dicinnamylidene-1,6-hexanediamine, trimethylenediamine, hexamethylenediamine carbamate, ethanolamine, 3,9-bis(3-aminopropyl)-2,4,8,10-tetraoxa-2-spiro[5.5]undecane, etc.) and salts thereof; and aromatic polyamines (for example, diaminodiphenylmethane, xylylenediamine, phenylenediamine, diaminodiphenyl sulfone, etc.).

Examples of the amino resin based crosslinking agent include methoxylated methylolurea, methoxylated methylol N,N-ethyleneurea, methoxylated methyloldicyanediamide, methoxylated methylolmelamine, methoxylated methylolbenzoguanamine, butoxylated methylolmelamine, butoxylated methylolbenzoguanamine, and so on. Preferably, there can be exemplified methoxylated methylolmelamine, butoxylated methylolmelamine, methylolated benzoguanamine, and so on.

Though a blending amount of the crosslinking agent (C) depends upon the amount of the crosslinkable functional group in the foregoing component (A), the NCO % in the isocyanate based crosslinking agent, the epoxy equivalent in the epoxy based crosslinking agent, or the like, the blending amount of the crosslinking agent (active components excluding the solvent and the like) is from about 0.01 to 8 parts by mass, preferably from 0.05 to 5 parts by mass, and more preferably from 0.1 to 3 parts by mass based on 100 parts by mass of a total amount of the acrylic copolymer that is the component (A) and the urethane resin that is the component (B). By regulating the blending amount of the crosslinking agent to from 0.01 to 8 parts by mass, even when the adhesive layer is reduced in thickness, a high adhesive strength can be obtained.

After optionally blending the crosslinking agent (C) in the foregoing acrylic copolymer (A) and urethane resin (B) and applying the blend on a base material sheet or a release sheet, the resultant is subjected to crosslinking (reaction) through a heat treatment at from about 70 to 120° C. for from about 30 to 180 seconds, whereby adhesiveness can be developed.

In addition to the foregoing components, an ultraviolet absorber, an antioxidant, an antiseptic, an anti-mold agent, a tackifier, a plasticizer, a defoaming agent, a wettability regulator, and the like may be blended within the range where the effects of the present invention are not impaired. However, in view of the fact that there may be a possibility that such the components elute under high-temperature and high-humidity conditions, it is preferable that such a component is not blended as far as possible.

In particular, it is preferable that there is not used as far as possible a tackifier which has been conventionally used for the purpose of enhancing the adhesive strength, such as rosin and a derivative thereof, polyterpene, a terpene phenol resin, a cumarone-indene resin, a petroleum based resin, a styrene resin, a xylene resin, etc.

Hereinafter, there is described the constitution of the pressure sensitive adhesive sheet of the present invention. The pressure sensitive adhesive sheet of the present invention has an adhesive layer composed of the foregoing components on at least one surface of a base material.

The base material which is used for the pressure sensitive adhesive sheet of the present invention is not particularly limited, and there can be used all of materials which are used as a base material sheet of usual pressure sensitive adhesive sheets. For example, there can be exemplified woven fabrics or nonwoven fabrics using fibers such as rayon fibers, acrylic fibers, polyester fibers, etc.; papers such as wood-free paper, glassine paper, impregnated paper, and coated paper, etc.; metal foils such as aluminum, and copper, etc.; foamed materials such as urethane foamed materials, and polyethylene foamed materials, etc.; plastic films such as a polyester film made of polyethylene terephthalate, polybutylene terephthalate, and polyethylene naphthalate, etc., a polyurethane film, a polyethylene film, a polypropylene film, a polyvinyl chloride film, a polyvinylidene chloride film, a polyvinyl alcohol film, an ethylene-vinyl acetate copolymer film, a polystyrene film, a polycarbonate film, an acrylic resin film, a norbornene based resin film, a cycloolefin resin film, etc.; laminates composed of two or more kinds thereof; and so on. Above all, polyethylene terephthalate and polyvinyl chloride films are especially preferable, which are relatively favorable with respect to the thickness precision and surface smoothness required for following reduction in thickness, and of which are easily available. Though a thickness of these base materials are not particularly limited, it is usually from about 1 to 300 µm, preferably from about 6 to 200 µm, and especially preferably from about 12 to 100 µm.

As described hereinabove, the adhesive layer which is used for the pressure sensitive adhesive sheet of the present invention is an adhesive layer in which a pressure sensitive adhesive constituting the adhesive layer contains (A) an acrylic copolymer having a crosslinkable functional group and (B) a urethane resin, the urethane resin is a product obtained by allowing an isocyanate-terminated urethane prepolymer obtained by a reaction between [b1] a diol and [b2] a polyvalent isocyanate compound to react with [b3] a chain extender, and the chain extender is composed of [b4] a compound having two hydroxyl groups and/or amino groups and [b5] a compound having three or more hydroxyl groups and/or amino groups, in a proportion of [b4] to [b5] of from 7/3 to 10/0 in terms of a mass ratio.

In the case where a thickness of the adhesive layer of the pressure sensitive adhesive sheet of the present invention is from 0.1 to 5 µm, the value of the present invention can be brought out to the maximum. In order to more bring out the value, it is preferably from 0.3 to 3.8 µm, more preferably from 0.5 to 2.5 µm, and especially preferably from 0.7 to 1.8 µm. When the thickness of the adhesive layer exceeds 5 µm, it is a matter of course that a sufficient adhesive strength is exhibited. However, the present invention has such a characteristic feature that even when the thickness of the adhesive layer is reduced to 5 µm or less, and moreover to a degree of 1 µm, the desired adhesive strength is exhibited.

The adhesive layer is optionally protected by a release sheet. Examples of the release sheet include release sheets obtained by applying a release agent such as a silicone resin, etc. on a paper base material such as glassine paper, coated paper, cast-coated paper, etc.; a laminate paper obtained by laminating a thermoplastic resin such as polyethylene, etc. on such a paper base material; a plastic film such as a polyester film made of polyethylene terephthalate, polybutylene terephthalate, polyethylene naphthalate, etc., a polyolefin film made of polypropylene, polyethylene, etc.; or the like. Though a thickness of this release sheet is not particularly limited, it is usually from about 20 to 150 µm.

As the release agent which is used for the purpose of forming a release agent layer, for example, there is used a rubber based elastomer such as an olefin based resin, an isoprene based resin, a butadiene based resin, etc., a long-chain alkyl based resin, an alkyd based resin, a fluorine based resin, a silicone based resin, or the like.

Though a thickness of the release agent layer formed on the release sheet is not particularly limited, in the case of applying the release agent in a solution state, the thickness of the release agent layer is preferably from 0.01 to 2.0 µm, and more preferably from 0.03 to 1.0 µm.

In the case where the release agent layer is formed using a thermoplastic resin such as polyethylene, polypropylene, etc., the thickness of the release agent layer is preferably from 3 to 50 µm, and more preferably from 5 to 40 µm.

As described hereinabove, in the pressure sensitive adhesive sheet of the present invention, even when an adhesive layer thereof is reduced in thickness to 1 µm, a desired adhesive strength is exhibited due to the specified acrylic copolymer (A) and the specified urethane resin (B) in the adhesive layer.

Hereinafter, there is described a preparation method of the pressure sensitive adhesive sheet of the present invention. The preparation method of the pressure sensitive adhesive sheet of the present invention is not particularly limited. For example, there can be adopted a method in which a solution obtained by dissolving (A) an acrylic copolymer having a crosslinkable functional group and (B) a urethane resin and, optionally, (C) a crosslinking agent to be added and an additive to be added in a small amount in an organic solvent is applied directly on a base material by using a roll coater, a knife coater, a roll knife coater, a reverse coater, a gravure coater, or the like, followed by heating for drying; a method in which an adhesive layer is formed on a release sheet for protecting the adhesive layer, and the adhesive layer is then stuck onto a base material; and the like. In order to make the thickness of the adhesive layer thin, it is necessary to take into account the workability or the like by diluting the pressure sensitive adhesive with an organic solvent prior to applying on the base material or release sheet.

As the organic solvent, there can be used the organic solvents enumerated as those which can be used at the time of preparing the urethane resin (B) through a chain extension reaction of the foregoing isocyanate-terminated urethane prepolymer.

A concentration of the solution obtained by diluting the pressure sensitive adhesive with the organic solvent is from about 3 to 20% by mass, preferably from about 5 to 15% by mass, and more preferably about 10% by mass from the viewpoints of workability at the time of applying and formation of a uniform adhesive layer reduced in thickness.

EXAMPLES

The present invention is hereunder described in more detail by reference to Examples and Comparative Examples, but it should be construed that the present invention is not limited thereto at all.

Various characteristics and performances measured in the Examples and Comparative Examples were evaluated in the following manners.

(1) Measurement of Weight Average Molecular Weight (Mw):

Mw is a value based on comparison with standard polystyrene, and it was measured using the following apparatus and conditions.

Apparatus name: HLC-8220GPC, prepared by Tosoh Corporation

Column: Column having TSKgel GMHXL, TSKgel GMHXL and TSKgel 2000HXL connected to each other in this order Solvent: Tetrahydrofuran
Injection amount: 80 µL
Measuring temperature: 40° C.
Flow rate: 1 mL/min
Detector: Differential refractometer (2) Measurement of Adhesive Strength:

After fabricating a pressure sensitive adhesive sheet, the pressure sensitive adhesive sheet was cut into a size of 25 mm×300 mm in an environment at 23° C. and 50% RH to form a pressure sensitive adhesive sheet test piece, which was then stuck onto an adherend (SUS304 steel plate) to prepare a test sample. At the point of time of elapsing 24 hours after sticking, the adhesive strength was measured at a tensile rate of 300 mm/min by means of a 180°-peeling method on the basis of JIS Z0237:2000.

Preparation Examples (1) Preparation of Urethane Resin (B):

Preparation Example 1

There were mixed 100 parts by mass of polypropylene glycol (PPG, Mw=2,000) as the diol [b1], 10.1 parts by mass of hexamethylene diisocyanate (HMDI) as the polyvalent isocyanate compound [b2], and 0.01 part by mass of dibutyltin dilaurate (DBTDL) as a catalyst to obtain a mixture, and after gradually increasing the temperature to 85° C., the mixture was stirred for 2 hours to obtain an isocyanate-terminated urethane prepolymer.

110 parts by mass of toluene was added to the obtained isocyanate-terminated urethane prepolymer, and after slow cooling to room temperature, 0.60 part by mass of 1,4-butanediol (BDO) as the chain extender [b4] was added dropwise thereto. After gradually increasing the temperature to 70° C., the contents were stirred for 2 hours to obtain a toluene solution of a urethane resin (B1) having Mw of 170,000.

Preparation Example 2

A toluene solution of a urethane resin (B2) having Mw of 160,000 was obtained in the same manner as that in the Preparation Example 1, except for changing the use amount of BDO to 0.54 part by mass and adding 0.06 part by mass of trimethylolpropane (TMP) as the chain extender [b5].

Preparation Example 3

A toluene solution of a urethane resin (B3) having Mw of 140,000 was obtained in the same manner as that in the Preparation Example 2, except for changing the use amount of BDO to 0.48 part by mass and changing the use amount of TMP to 0.12 part by mass.

Preparation Example 4

A toluene solution of a urethane resin (B4) having Mw of 160,000 was obtained in the same manner as that in Preparation Example 2, except for changing the use amount of BDO to 0.42 part by mass and changing the use amount of TMP to 0.18 part by mass.

Preparation Example 5

A toluene solution of a urethane resin (B5) having Mw of 140,000 was obtained in the same manner as that in the Preparation Example 1, except for using 0.40 part by mass of 2-aminoethanol (2-AmE) as the chain extender [b4] instead of using BDO.

Preparation Example 6

A toluene solution of a urethane resin (B6) having Mw of 140,000 was obtained in the same manner as that in Preparation Example 2, except for changing the use amount of BDO to 0.30 part by mass and changing the use amount of TMP to 0.30 part by mass.

Kinds of starting raw materials and their compositions of the urethane resins B1 to B6 obtained in Preparation Examples 1 to 6 are shown in Table 1.

TABLE 1

| | | Prepolymer | | Chain extender [b3] | | Chain extender [b3] | | |
| --- | --- | --- | --- | --- | --- | --- | --- | --- |
| | | Diol [b1] | Polyvalent isocyanate [b2] | Compound [b4] having two functional groups reactive with isocyanate group | | Compound [b5] having three or more functional groups reactive with isocyanate group | | [b4]/[b5] = |
| | Urethane resin (B) | PPG parts by mass | HMDI parts by mass | BDO parts by mass | 2-AmE parts by mass | TMP parts by mass | 2HPEA parts by mass | 7/3 to 10/0 mass ratio |
| Preparation Example 1 | B1 | 100 | 10.1 | 0.60 | — | — | — | 10/0 |

TABLE 1-continued (Urethane resin formulation)

| | | Prepolymer | | Chain extender [b3] | | Chain extender [b3] | | |
|---|---|---|---|---|---|---|---|---|
| | Urethane | Diol [b1] | Polyvalent isocyanate [b2] | Compound [b4] having two functional groups reactive with isocyanate group | | Compound [b5] having three or more functional groups reactive with isocyanate group | | [b4]/ [b5] = |
| | resin (B) | PPG parts by mass | HMDI parts by mass | BDO parts by mass | 2-AmE parts by mass | TMP parts by mass | 2HPEA parts by mass | 7/3 to 10/0 mass ratio |
| Preparation Example 2 | B2 | 100 | 10.1 | 0.54 | — | 0.06 | — | 9/1 |
| Preparation Example 3 | B3 | 100 | 10.1 | 0.48 | — | 0.12 | — | 8/2 |
| Preparation Example 4 | B4 | 100 | 10.1 | 0.42 | — | 0.18 | — | 7/3 |
| Preparation Example 5 | B5 | 100 | 10.1 | — | 0.40 | — | — | 10/0 |
| Preparation Example 6 | B6 | 100 | 10.1 | 0.30 | — | 0.30 | — | 5/5 |

The compound names of the abbreviations are as follows.
PPG: Polypropylene glycol (Mw: 2,000)
HMDI: Hexamethylene diisocyanate
BDO: 1,4-Butanediol
TMP: Trimethylolpropane
2-AmE: 2-Aminoethanol
2HPEA: N-(2-Hydroxypropyl)ethanolamine Preparation of Acrylic Copolymer (A)

Preparation Example 7

90 parts by mass of butyl acrylate (BA), 10 parts by mass of acrylic acid (AAc), 200 parts by mass of ethyl acetate, and 0.2 part by mass of azobisisobutyronitrile as a polymerization initiator were charged in a reactor and mixed. Deaeration with a nitrogen gas was conducted for 4 hours, and after gradually increasing the temperature to 60° C., a polymerization reaction was conducted with stirring for 24 hours, thereby obtaining an ethyl acetate solution of an acrylic copolymer (A1) having Mw of 650,000.

Preparation Example 8

A polymerization reaction was conducted in the same manner as that in the Preparation Example 7, except for changing the use amount of BA to 95 parts by mass and changing the use amount of AAc to 5 parts by mass, thereby obtaining an ethyl acetate solution of an acrylic copolymer (A2) having Mw of 650,000.

Preparation Example 9

There were mixed 85 parts by mass of BA, 14 parts by mass of N-acryloylmorpholine (ACMO), 1 part by mass of 2-hydroxyethyl acrylate (HEA), 200 parts by mass of ethyl acetate, and 0.2 part by mass of azobisisobutyronitrile as a polymerization initiator. Deaeration with nitrogen was conducted for 4 hours, and after gradually increasing the temperature to 60° C., a polymerization reaction was conducted with stirring for 24 hours, thereby obtaining an ethyl acetate solution of an acrylic copolymer (A3) having Mw of 600,000.

Kinds of starting raw materials and their compositions of the acrylic polymers (A1) to (A3) obtained in the Preparation Examples 7 to 9 are shown in Table 2.

TABLE 2

(Acrylic polymer formulation)

| | | Monomer component | | | |
|---|---|---|---|---|---|
| | Acrylic polymer (A) | BA parts by mass | AAc parts by mass | ACMO parts by mass | HEA parts by mass |
| Preparation Example 7 | A1 | 90 | 10 | — | — |
| Preparation Example 8 | A2 | 95 | 5 | — | — |
| Preparation Example 9 | A3 | 85 | — | 14 | 1 |

The compound names of the abbreviations are as follows.
BA: Butyl acrylate
AAc: Acrylic acid,
ACMO: N-Acryloylmorpholine
HEA: 2-Hydroxyethyl acrylate Example 1

A mixture of 180 parts by mass (solid content: 90 parts by mass) of the toluene solution of the urethane resin (B1) of the Preparation Example 1, 33.4 parts by mass (solid content: 10 parts by mass) of the ethyl acetate solution of the acrylic polymer (A1) of the Preparation Example 7, and 3 parts by mass of, as a crosslinking agent, an isocyanate based crosslinking agent [an ethyl acetate solution of trimethylolpropane-modified tolylene diisocyanate, solid content: 75% by mass, a trade name: CORONATE HL, prepared by Nippon Polyurethane Industry Co., Ltd.] was diluted with toluene such that the solid content was 10% by mass, thereby obtaining a solution of a pressure sensitive adhesive composition.

This solution was applied on a 38 μm-thick polyester film having been treated with a silicone [a trade name: SP-PET381031, prepared by Lintec Corporation] such that a thickness of the adhesive layer after drying was 1 μm, and after drying at 100° C. for 1 minute, the resultant was transferred onto a 25 μm-thick polyester film [a trade name:

T-100, prepared by Mitsubishi Polyester, Inc.], thereby obtaining a pressure sensitive adhesive sheet.

Examples 2 to 22 and Comparative Examples 1 to 10

Each of the ethyl acetate solutions of the acrylic polymers (A1 to A3), each of the toluene solutions of the urethane resins (B1 to B6), and the crosslinking agent (C) were blended in a blending ratio shown in Table 3, and the blend was treated in the same manner as that in Example 1, thereby obtaining a pressure sensitive adhesive sheet. A blending ratio of each of the components and a measured adhesive strength in each of the Examples and Comparative Examples are described in combination in Table 3. Incidentally, in Table 3, a numerical value of each of the components expresses parts by mass of the solid content, and the solid content as referred to in the present invention means all of the components other than the solvent.

three or more functional groups, even when the adhesive layer is reduced to 1 μm in thickness, a desired adhesive strength is exhibited.

Example 23

A pressure sensitive adhesive sheet was obtained in the same manner as that in Example 10, except for using a 6 μm-thick polyester film [a trade name: LUMIRROR, prepared by Toray Industries, Inc., which is described as "6 μm PET" in the column of "Base material" in Table 4] in place of the 25 μm-thick polyester film [a trade name: T-100, prepared by Mitsubishi Polyester, Inc.].

Example 24

A pressure sensitive adhesive sheet was obtained in the same manner as that in Example 10, except for using a 50 μm-thick vinyl chloride film [containing 24% by weight of,

TABLE 3

| | Acrylic polymer (A) | | Urethane resin (B) | | Crosslinking agent (C) | | Adhesive strength N/25 mm |
|---|---|---|---|---|---|---|---|
| | kind | parts by mass | Kind | parts by mass | kind | parts by mass | |
| Example 1 | A1 | 10 | B1 | 90 | CORONATE HL | 2.25 | 5.4 |
| Example 2 | A1 | 10 | B2 | 90 | CORONATE HL | 2.25 | 4.9 |
| Example 3 | A1 | 10 | B3 | 90 | CORONATE HL | 2.25 | 6.0 |
| Example 4 | A1 | 10 | B4 | 90 | CORONATE HL | 2.25 | 4.3 |
| Example 5 | A1 | 10 | B5 | 90 | CORONATE HL | 2.25 | 6.7 |
| Example 6 | A2 | 10 | B1 | 90 | CORONATE HL | 2.25 | 5.8 |
| Example 7 | A2 | 10 | B2 | 90 | CORONATE HL | 2.25 | 5.7 |
| Example 8 | A2 | 10 | B3 | 90 | CORONATE HL | 2.25 | 6.5 |
| Example 9 | A2 | 10 | B4 | 90 | CORONATE HL | 2.25 | 5.1 |
| Example 10 | A2 | 10 | B5 | 90 | CORONATE HL | 2.25 | 6.7 |
| Example 11 | A1 | 20 | B1 | 80 | CORONATE HL | 2.25 | 3.4 |
| Example 12 | A1 | 20 | B2 | 80 | CORONATE HL | 2.25 | 5.4 |
| Example 13 | A1 | 20 | B3 | 80 | CORONATE HL | 2.25 | 7.7 |
| Example 14 | A1 | 20 | B4 | 80 | CORONATE HL | 2.25 | 6.3 |
| Example 15 | A1 | 20 | B5 | 80 | CORONATE HL | 2.25 | 7.2 |
| Example 16 | A2 | 20 | B1 | 80 | CORONATE HL | 2.25 | 4.6 |
| Example 17 | A2 | 20 | B2 | 80 | CORONATE HL | 2.25 | 5.6 |
| Example 18 | A2 | 20 | B3 | 80 | CORONATE HL | 2.25 | 6.7 |
| Example 19 | A2 | 20 | B4 | 80 | CORONATE HL | 2.25 | 5.4 |
| Example 20 | A2 | 20 | B5 | 80 | CORONATE HL | 2.25 | 6.0 |
| Example 21 | A3 | 10 | B1 | 90 | CORONATE HL | 2.25 | 5.5 |
| Example 22 | A3 | 20 | B1 | 80 | CORONATE HL | 2.25 | 3.9 |
| Comparative Example 1 | — | — | B1 | 100 | CORONATE HL | 2.25 | 0.8 |
| Comparative Example 2 | — | — | B2 | 100 | CORONATE HL | 2.25 | 2.4 |
| Comparative Example 3 | — | — | B3 | 100 | CORONATE HL | 2.25 | 2.4 |
| Comparative Example 4 | — | — | B4 | 100 | CORONATE HL | 2.25 | 1.4 |
| Comparative Example 5 | — | — | B5 | 100 | CORONATE HL | 2.25 | 1.4 |
| Comparative Example 6 | — | — | B6 | 100 | CORONATE HL | 2.25 | 0.3 |
| Comparative Example 7 | A1 | 100 | — | — | CORONATE HL | 2.25 | 0.5 |
| Comparative Example 8 | A2 | 100 | — | — | CORONATE HL | 2.25 | 1.5 |
| Comparative Example 9 | A3 | 100 | — | — | CORONATE HL | 2.25 | 0.2 |
| Comparative Example 10 | A1 | 10 | B6 | 90 | CORONATE HL | 2.25 | 1.6 |

The following are clear from Table 3.

That is, in the case of a pressure sensitive adhesive sheet having an adhesive layer formed of the acrylic polymer (A1 to A3) having a crosslinkable functional group and the urethane resin (B1 to B5) obtained by allowing an isocyanate-terminated urethane prepolymer to react with one kind of a chain extender having two specified functional groups or the subject chain extender and a chain extender having as a plasticizer, a polyester based plasticizer, which is described as "50 μm PVC" in the column of "Base material" in Table 4] in place of the 25 μm-thick polyester film [a trade name: T-100, prepared by Mitsubishi Polyester, Inc.].

Example 25

A pressure sensitive adhesive sheet was obtained in the same manner as that in Example 13, except for using a 6

μm-thick polyester film [a trade name: LUMIRROR, prepared by Toray Industries, Inc., which is described as "6 μm PET" in the column of "Base material" in Table 4] in place of the 25 μm-thick polyester film [a trade name: T-100, prepared by Mitsubishi Polyester, Inc.].

Example 26

A pressure sensitive adhesive sheet was obtained in the same manner as that in Example 13, except for using a 50 μm-thick vinyl chloride film [containing 24% by weight of, as a plasticizer, a polyester based plasticizer, which is described as "50 μm PVC" in the column of "Base material" in Table 4] in place of the 25 μm-thick polyester film [a trade name: T-100, prepared by Mitsubishi Polyester, Inc.].

Example 27

A pressure sensitive adhesive sheet was obtained in the same manner as that in Example 13, except for conducting applying such that the thickness of the adhesive layer after drying was 5 μm. The used 25 μm-thick polyester film is described as "25 μm PET" in the column of "Base material" in Table 4 (the same is also applicable to Examples 28 to 35).

Example 28

A pressure sensitive adhesive sheet was obtained in the same manner as that in Example 13, except for conducting applying such that the thickness of the adhesive layer after drying was 10 μm.

Example 29

A pressure sensitive adhesive sheet was obtained in the same manner as that in Example 13, except for conducting applying such that the thickness of the adhesive layer after drying was 20 μm.

Example 30

A pressure sensitive adhesive sheet was obtained in the same manner as that in Example 16, except for conducting applying such that the thickness of the adhesive layer after drying was 5 μm.

Example 31

A pressure sensitive adhesive sheet was obtained in the same manner as that in Example 16, except for conducting applying such that the thickness of the adhesive layer after drying was 10 μm.

Example 32

A pressure sensitive adhesive sheet was obtained in the same manner as that in Example 16, except for conducting applying such that the thickness of the adhesive layer after drying was 20 μm.

Example 33

A pressure sensitive adhesive sheet was obtained in the same manner as that in Example 18, except for conducting applying such that the thickness of the adhesive layer after drying was 5 μm.

Example 34

A pressure sensitive adhesive sheet was obtained in the same manner as that in Example 18, except for conducting applying such that the thickness of the adhesive layer after drying was 10 μm.

Example 35

A pressure sensitive adhesive sheet was obtained in the same manner as that in Example 18, except for conducting applying such that the thickness of the adhesive layer after drying was 20 μm.

A blending ratio of each of the components and a measured adhesive strength in each of Examples 23 to 35 are described in combination in Table 4. Incidentally, in Table 4, a numerical value of each of the components expresses parts by mass of the solid content, and the solid content as referred to in the present invention means all of the components other than the solvent.

TABLE 4

| | Acrylic polymer (A) | | Urethane resin (B) | | Crosslinking agent (C) | | Adhesive strength | | Thickness of adhesive layer |
| --- | --- | --- | --- | --- | --- | --- | --- | --- | --- |
| | Kind | parts by mass | Kind | parts by mass | Kind | parts by mass | N/25 mm | Base material | (μm) |
| Example 23 | A2 | 10 | B5 | 90 | CORONATE HL | 2.25 | 6.2 | 6 μm PET | 1 |
| Example 24 | A1 | 20 | B3 | 80 | CORONATE HL | 2.25 | 4.3 | 50 μm PVC | 1 |
| Example 25 | A2 | 10 | B5 | 90 | CORONATE HL | 2.25 | 6.2 | 6 μm PET | 1 |
| Example 26 | A1 | 20 | B3 | 80 | CORONATE HL | 2.25 | 11.1 | 50 μm PVC | 1 |
| Example 27 | A1 | 20 | B3 | 80 | CORONATE HL | 2.25 | 10.2 | 25 μm PET | 5 |
| Example 28 | A1 | 20 | B3 | 80 | CORONATE HL | 2.25 | 12.5 | 25 μm PET | 10 |
| Example 29 | A1 | 20 | B3 | 80 | CORONATE HL | 2.25 | 16.0 | 25 μm PET | 20 |
| Example 30 | A2 | 20 | B1 | 80 | CORONATE HL | 2.25 | 7.3 | 25 μm PET | 5 |
| Example 31 | A2 | 20 | B1 | 80 | CORONATE HL | 2.25 | 9.5 | 25 μm PET | 10 |
| Example 32 | A2 | 20 | B1 | 80 | CORONATE HL | 2.25 | 14.2 | 25 μm PET | 20 |
| Example 33 | A2 | 20 | B3 | 80 | CORONATE HL | 2.25 | 9.5 | 25 μm PET | 5 |
| Example 34 | A2 | 20 | B3 | 80 | CORONATE HL | 2.25 | 12.0 | 25 μm PET | 10 |
| Example 35 | A2 | 20 | B3 | 80 | CORONATE HL | 2.25 | 16.0 | 25 μm PET | 20 |

The following are clear from Table 4.

That is, in the case of a pressure sensitive adhesive sheet having an adhesive layer formed of a pressure sensitive adhesive containing the acrylic polymer having a crosslinkable functional group (A1 to A3) and the urethane resin (B1 to B5) obtained by allowing an isocyanate-terminated urethane prepolymer to react with one kind of a chain extender having two specified functional groups or the subject chain extender and a chain extender having three or more functional groups, a desired adhesive strength is exhibited without relying upon the thickness or kind of the base material. In addition, a desired adhesive strength is exhibited without reduction in thickness of the adhesive layer.

INDUSTRIAL APPLICABILITY

The pressure sensitive adhesive sheet of the present invention, which even when a thickness of an adhesive layer thereof is reduced, its adhesive strength is not lowered, is useful as a pressure sensitive adhesive sheet to be used for joining or temporary bonding at the time of processing of members of an electronic appliance or an optical appliance. Also, it is possible to contrive to reduce a total thickness even when forming a multilayered structure. Hence, pressure sensitive adhesive sheet of the present invention is useful in a variety of fields.

The invention claimed is:

1. A pressure sensitive adhesive sheet, comprising a base material having an adhesive layer provided on at least one surface thereof, wherein:
the adhesive layer comprises a pressure sensitive adhesive comprising (A) an acrylic copolymer having a crosslinkable functional group, and (B) a urethane resin; wherein
said urethane resin (B) is a product obtained by allowing an isocyanate-terminated urethane prepolymer obtained by a reaction between [b1] a diol and [b2] a polyvalent isocyanate compound to react with [b3] a chain extender comprising [b4] at least one compound selected from the group consisting of an aliphatic diol, an alkanolamine, a bisphenol and a phenolamine, and [b5] a compound having three or more groups selected from hydroxyl groups and amino groups in a proportion of [b4] and [b5] represented by [b4]/[b5] of from 7/3 to 9/1 in terms of a mass ratio,
a proportion of said acrylic copolymer (A) and said urethane resin (B) represented by (A)/(B) is from 40/60 to 1/99 in terms of a mass ratio, and
a sum of hydroxyl groups and amino groups in each compound of [b4] is two groups.

2. The pressure sensitive adhesive sheet according to claim 1, wherein the diol [b1] is a glycol having a molecular weight of from 1,000 to 3,000.

3. The pressure sensitive adhesive sheet according to claim 1, wherein the [b4] is a compound having one hydroxyl group and one amino group.

4. The pressure sensitive adhesive sheet according to claim 1, wherein the crosslinkable functional group is from an ethylenically unsaturated carboxylic acid or a hydroxyalkyl(meth)acrylate.

5. The pressure sensitive adhesive sheet according to claim 1, wherein a monomer constituting the acrylic copolymer (A) further comprises a nitrogen-containing ethylenically unsaturated monomer as a constituent component.

6. The pressure sensitive adhesive sheet according to claim 1, further comprising a crosslinking agent.

7. The pressure sensitive adhesive sheet according to claim 1, wherein a weight average molecular weight (Mw) of the acrylic copolymer (A) is from 300,000 to 1,500,000.

8. The pressure sensitive adhesive sheet according to claim 1, wherein a thickness of the adhesive layer is from 0.1 to 5 μm.

9. The pressure sensitive adhesive sheet according to claim 2, wherein the [b4] is a compound having one hydroxyl group and one amino group.

10. The pressure sensitive adhesive sheet according to claim 2, wherein the crosslinkable functional group is from an ethylenically unsaturated carboxylic acid or a hydroxyalkyl(meth)acrylate.

11. The pressure sensitive adhesive sheet according to claim 2, wherein a monomer constituting the acrylic copolymer (A) further comprises a nitrogen-containing ethylenically unsaturated monomer as a constituent component.

12. The pressure sensitive adhesive sheet according to claim 2, further comprising a crosslinking agent.

13. The pressure sensitive adhesive sheet according to claim 2, wherein a weight average molecular weight (Mw) of the acrylic copolymer (A) is from 300,000 to 1,500,000.

14. The pressure sensitive adhesive sheet according to claim 2, wherein a thickness of the adhesive layer is from 0.1 to 5 μm.

* * * * *